(12) United States Patent
Error

(10) Patent No.: US 7,941,394 B2
(45) Date of Patent: May 10, 2011

(54) USER INTERFACE PROVIDING SUMMARY INFORMATION OR A STATUS PANE IN A WEB ANALYTICS TOOL

(75) Inventor: Brett Michael Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 184 days.

(21) Appl. No.: 11/313,875

(22) Filed: Dec. 20, 2005

(65) Prior Publication Data

US 2006/0277212 A1 Dec. 7, 2006

Related U.S. Application Data

(60) Provisional application No. 60/688,229, filed on Jun. 6, 2005, provisional application No. 60/687,626, filed on Jun. 3, 2005.

(51) Int. Cl.
*G06F 17/30* (2006.01)

(52) U.S. Cl. ........................................ 707/600; 715/200

(58) Field of Classification Search ........................ 707/6
See application file for complete search history.

(56) References Cited

U.S. PATENT DOCUMENTS

| | | | |
|---|---|---|---|
| 5,760,772 A | 6/1998 | Austin | |
| 5,796,402 A | 8/1998 | Ellison-Taylor | |
| 5,821,931 A | 10/1998 | Berquist et al. | |
| 5,835,087 A | 11/1998 | Herz et al. | |
| 5,870,559 A | 2/1999 | Leshem et al. | |
| 5,966,139 A | 10/1999 | Anupam et al. | |
| 6,008,809 A | 12/1999 | Brooks | |
| 6,026,397 A | 2/2000 | Sheppard | |
| 6,182,097 B1 | 1/2001 | Hansen et al. | |
| 6,188,405 B1 | 2/2001 | Czerwinski et al. | |
| 6,266,649 B1 | 7/2001 | Linden et al. | |
| 6,310,631 B1 | 10/2001 | Cecco et al. | |
| 6,317,787 B1 * | 11/2001 | Boyd et al. | 709/224 |
| 6,393,479 B1 | 5/2002 | Glommen et al. | |
| 6,414,677 B1 | 7/2002 | Robertson et al. | |
| 6,473,102 B1 | 10/2002 | Rodden et al. | |
| 6,473,738 B1 | 10/2002 | Garrett et al. | |
| 6,486,882 B1 | 11/2002 | Wolverton et al. | |

(Continued)

FOREIGN PATENT DOCUMENTS

WO    WO 00/58866    10/2000

(Continued)

OTHER PUBLICATIONS

U.S. Appl. No. 10/113,808, filed Mar. 29, 2002, Wiles, Jr.

(Continued)

*Primary Examiner* — Yicun Wu
*Assistant Examiner* — Syed H Hasan
(74) *Attorney, Agent, or Firm* — Robert C. Kowert; Meyertons, Hood, Kivlin, Kowert & Goetzel, P.C.

(57) ABSTRACT

A system and method provide a summary comparison of data. The summary may compare filtered and unfiltered data or one set of filtered data to another. The system presents a status pane or window to a user in conjunction with filtered data that is dynamically updated to correspond to the data. A summary of the filtered data is available for display side by side with other filtered data or unfiltered data. The reports and summary are dynamically updated.

26 Claims, 12 Drawing Sheets

U.S. PATENT DOCUMENTS

| | | | |
|---|---|---|---|
| 6,489,968 B1 | 12/2002 | Ortega et al. | |
| 6,654,036 B1 | 11/2003 | Jones | |
| 6,671,711 B1 | 12/2003 | Pirolli et al. | |
| 6,704,016 B1 | 3/2004 | Oliver et al. | |
| 6,754,873 B1 | 6/2004 | Law et al. | |
| 6,766,370 B2 | 7/2004 | Glommen et al. | |
| 6,850,988 B1 | 2/2005 | Reed | |
| 6,862,574 B1 | 3/2005 | Srikant et al. | |
| 6,912,534 B2* | 6/2005 | DeBettencourt et al. | 707/10 |
| 6,950,993 B2 | 9/2005 | Breinberg | |
| 6,963,874 B2 | 11/2005 | Kasriel et al. | |
| 6,968,511 B1 | 11/2005 | Robertson et al. | |
| 6,980,962 B1 | 12/2005 | Arganbright et al. | |
| 7,039,871 B2* | 5/2006 | Cronk | 715/741 |
| 7,085,682 B1 | 8/2006 | Heller et al. | |
| 2002/0040395 A1 | 4/2002 | Davis et al. | |
| 2002/0042750 A1 | 4/2002 | Morrison | |
| 2002/0087621 A1 | 7/2002 | Hendriks | |
| 2002/0091591 A1 | 7/2002 | Tsumura et al. | |
| 2002/0093529 A1 | 7/2002 | Daoud et al. | |
| 2002/0099812 A1 | 7/2002 | Davis et al. | |
| 2002/0143662 A1 | 10/2002 | Clark et al. | |
| 2002/0152284 A1 | 10/2002 | Cambray et al. | |
| 2002/0165936 A1 | 11/2002 | Alston et al. | |
| 2002/0178169 A1 | 11/2002 | Nair et al. | |
| 2002/0186237 A1 | 12/2002 | Bradley et al. | |
| 2002/0186253 A1 | 12/2002 | Rodden et al. | |
| 2002/0198939 A1 | 12/2002 | Lee et al. | |
| 2003/0023712 A1 | 1/2003 | Zhao et al. | |
| 2003/0025737 A1 | 2/2003 | Breinberg | |
| 2003/0033405 A1 | 2/2003 | Perdon et al. | |
| 2003/0055883 A1 | 3/2003 | Wiles, Jr. | |
| 2003/0110249 A1* | 6/2003 | Buus et al. | 709/224 |
| 2003/0128231 A1 | 7/2003 | Kasriel et al. | |
| 2003/0131097 A1 | 7/2003 | Kasriel et al. | |
| 2004/0049417 A1 | 3/2004 | Nickerson et al. | |
| 2004/0059746 A1* | 3/2004 | Error et al. | 707/102 |
| 2004/0133671 A1 | 7/2004 | Taniguchi | |
| 2004/0174397 A1* | 9/2004 | Cereghini et al. | 345/855 |
| 2004/0190448 A1 | 9/2004 | Fishteyn et al. | |
| 2004/0205157 A1 | 10/2004 | Bibelnieks et al. | |
| 2004/0225687 A1 | 11/2004 | Larsson et al. | |
| 2005/0015376 A1 | 1/2005 | Fraser et al. | |
| 2005/0044508 A1 | 2/2005 | Stockton | |
| 2005/0204307 A1 | 9/2005 | Nadal | |
| 2005/0229110 A1 | 10/2005 | Gegner et al. | |
| 2005/0235222 A1 | 10/2005 | Barbanson et al. | |
| 2005/0273727 A1 | 12/2005 | Barbanson et al. | |
| 2006/0143162 A1 | 6/2006 | Bernacki et al. | |
| 2006/0271671 A1 | 11/2006 | Hansen | |

FOREIGN PATENT DOCUMENTS

WO      WO 02/23438 A2      3/2002

OTHER PUBLICATIONS

U.S. Appl. No. 10/113,322, filed Mar. 29, 2002, Zhao et al.
U.S. Appl. No. 10/057,513, filed Jan. 25, 2002, Alston et al.
U.S. Appl. No. 09/835,112, filed Apr. 13, 2001, Cambray et al.
Hong, J. et al., "What Did They Do? Understanding Clickstreams with the WebQuilt Visualization System," WebQuilt homepage http://guir.berkeley.edu/projects/webquilt/, pp. 1-7.
Hong, J. et al., "WebQuilt: A Framework for Capturing and Visualizing the Web Experience," WebQuilt, homepage: http://guir.berkeley.edu/projects/webquilt/, May 1-5, 2001, pp. 1-8.
Notification of International Search Report and Written Opinion, PCT/US04/39253, Dec. 13, 2005, 13 pages.
Notification of International Search Report and Written Opinion, PCT/US04/06898, Feb. 9, 2005, 8 pages.
Notification of International Search Report and Written Opinion, PCT/US04/06696, Feb. 28, 2005, 9 pages.
Supplementary European Search Report, EP 04717485, Nov. 7, 2006, 3 pages.
International Search Report and Written Opinion, PCT/US06/20548, Sep. 19, 2007, 10 pages.
International Search Report and Written Opinion, PCT/US06/21937, Sep. 25, 2007, 8 pages.
PCT International Search Report and Written Opinion, PCT/US06/41892, Jun. 21, 2007, 12 pages.
Chinese Office Action, Chinese Application No. 200480034359.5, Jan. 25, 2008, 10 pages.
International Search Report and Written Opinion, PCT/US06/20550, Jun. 17, 2008, 8 pages.
Extended European Search Report, European Application No. EP 06772307.2, Jan. 12, 2009, 9 pages.
Extended European Search Report, European Application No. EP06826800.2, Jan. 12, 2009, 8 pages.
"WebTrends 7 Report User's Guide," Mar. 2005, pp. I-VIII, 1-82, [Online] [Retrieved on Dec. 15, 2008] Retrieved from the Internet<URL:http://product.webtrends.com/WRC/7.1/Documents/ReportUsersGuide.pdf>.
"WebTrends Guide to Web Analytics," Jan. 2005, pp. I-X, 1-224, [Online] [Retrieved on Dec. 15, 2008] Retrieved from the Internet<URL:http://product.webtrends.com/WRC/7.1/Documents/WebAnalytics.pdf>.
Chinese Second Office Action, Chinese Application No. 200480034359.5, Mar. 13, 2009, 7 pages.
Extended European Search Report, European Application No. 06826800.2, Jan. 12, 2009, 8 pages.
Chinese Office Action, Chinese Application No. 2006800278491, Apr. 10, 2009, 12 pages.

\* cited by examiner

USER INTERFACE PROVIDING SUMMARY INFORMATION OR A STATUS PANE IN A WEB ANALYTICS TOOL

RELATED APPLICATIONS

This application claims priority under 35 U.S.C. §119 from U.S. Provisional Application Ser. No. 60/688,229, filed Jun. 6, 2005 by Brett M. Error, entitled "User Interface Providing Summary Information or a Status Pane in a Web Analytics Tool," and U.S. Provisional Application Ser. No. 60/687,626, filed Jun. 3, 2005 by Brett Error, entitled "Incrementally Adding Segmentation Criteria to a Data Set,", and claims priority under §120 from U.S. patent application Ser. No. 11/313,588 filed Dec. 20, 2005 by Brett M. Error, entitled "Incrementally Adding Segmentation Criteria to a Data Set,", and is related to U.S. patent application Ser. No. 10/993,397, filed Nov. 18, 2004 by Brett M. Error et al., entitled "Assigning Value to Elements Contributing to Business Success,", U.S. patent application Ser. No. 10/609,008, filed Jun. 27, 2003 by Brett Error et al., entitled "Capturing and Presenting Site Visitation Path Data,", and U.S. Patent Application Ser. No. 60/688,076, filed Jun. 6, 2005 by Catherine Wong et al., entitled "Website Traffic Analysis Engine and User Interface," each of which is incorporated herein by reference.

BACKGROUND OF THE INVENTION

1. Field of the Invention

This invention relates generally to user interfaces for tools relating to databases. More particularly, the present invention relates to graphical user interfaces for reviewing data returned in response to a query. Still more particularly, the present invention is a user interface for presenting summary information about website usage for use with web analytics tools.

2. Description of the Related Art

One of the most common sales mantras is "know your customer." This basic tenet of selling has grown far beyond knowing who enters the store; it requires among other things, knowing what attracts customers, what they look at, how they move around a marketplace, and how long they stay. By studying customer buying habits, retailers have been able to maximize their revenues through tailoring their promotions, offerings, and even store layouts to suit their customers' preferences and habits.

Thus, website providers often wish to collect data that describes usage and visitation patterns for their websites and for individual web pages within the sites. Such information can be extremely valuable in developing usage statistics for various purposes, including for example estimating server load, determining advertising rates, identifying areas of websites that are in need of redesign, and the like.

Such information is useful in many ways, including for example collecting feedback that leads to improved web page design, determining the effect of various degrees of prominence of links and graphic elements on web pages, and determining the contribution of individual links to an eventual sale. Users, such as website administrators, often wish to analyze the results in many different ways.

Web analytics refers to the analysis of data created by website usage. For instance, web analytics can be used to mine visitor traffic data. A variety of visitor traffic data is measured such as what browser is being used, what links on a given web page were selected, whether a product was purchased, etc. There are number of web analytics tools presently available such as Site Catalyst version 11 from Omniture of Orem, Utah. These tools are able to capture data on website usage, and responsive to a user's request, display a variety of different metrics on website usage such as fallout/conversion, A/B testing, etc.

One problem such existing tools is that they present lots of raw data without any context. The data can be in response to application of specific filters or in response to very particular queries, and the data is typically presented to the user in tabular form. For example, at a given time the user may have multiple window panes showing the results of different filters and attributes. Presently, there is no mechanism to provide the user with additional context and present summary data reflecting a comparison of data before and after the filter is applied.

The prior art has provided some different graphical displays such as fallout reports, conversion reports, flow reports as well as the ability to show certain data as bar graphs or pie charts, but there presently is not a mechanism to provide summary data in the context of a detailed review of the filtered data.

Thus, there is a need for an improved graphical user interface for web analytics tools that solves the above shortcomings of the prior art.

SUMMARY

The present invention is a system and method for providing a summary comparison of data, for example of filtered and unfiltered data or of two different sets of filtered data. The present invention provides a status pane or window that may be presented to the user in conjunction with the filtered data and that is dynamically updated to correspond to the tabular data presented to the user. Selectable buttons are provided in a user interface according to one embodiment, which activate a status pane generation and storage module and to generate a summary comparison of filtered and unfiltered data or of two different sets of filtered data. In other embodiments, the status pane may be activated in other ways.

Users can launch various pre-packaged reports onto a single workspace and easily click on any data item to filter the entire result set by that item. A summary of the filtered data also is available for display side by side with unfiltered data or other sets of filtered data. The results of these functions are returned almost instantaneously, enabling users to analyze the effects of combinations of filters and understand the significance of the applied filter(s).

The system includes a client that sends a query to network, specifying which reports are requested, and optionally specifying one or more filters for the unfiltered report data. In response to query, network returns data that contains a representation of the report data, which may or may not be encoded. Once client has received sufficient data to generate a report, it sends report to display for output to the user. A status pane user interface module includes routines for the generation of panes or windows as well as buttons and other attributes for user interaction with the web analytics tool.

These aspects of the present invention provide greater visibility of the information generated by the above-described methods, providing the website owner valuable insight into which elements of a website are contributing to the success of the site and contributing to return on investment. More specifically, using a side by side comparison allows the user to understand quickly the significance of the segment(s) being built.

BRIEF DESCRIPTION OF THE DRAWINGS

FIG. 8 illustrates a report in greater detail according to one embodiment of the present invention.

DETAILED DESCRIPTION

Figure 1A:
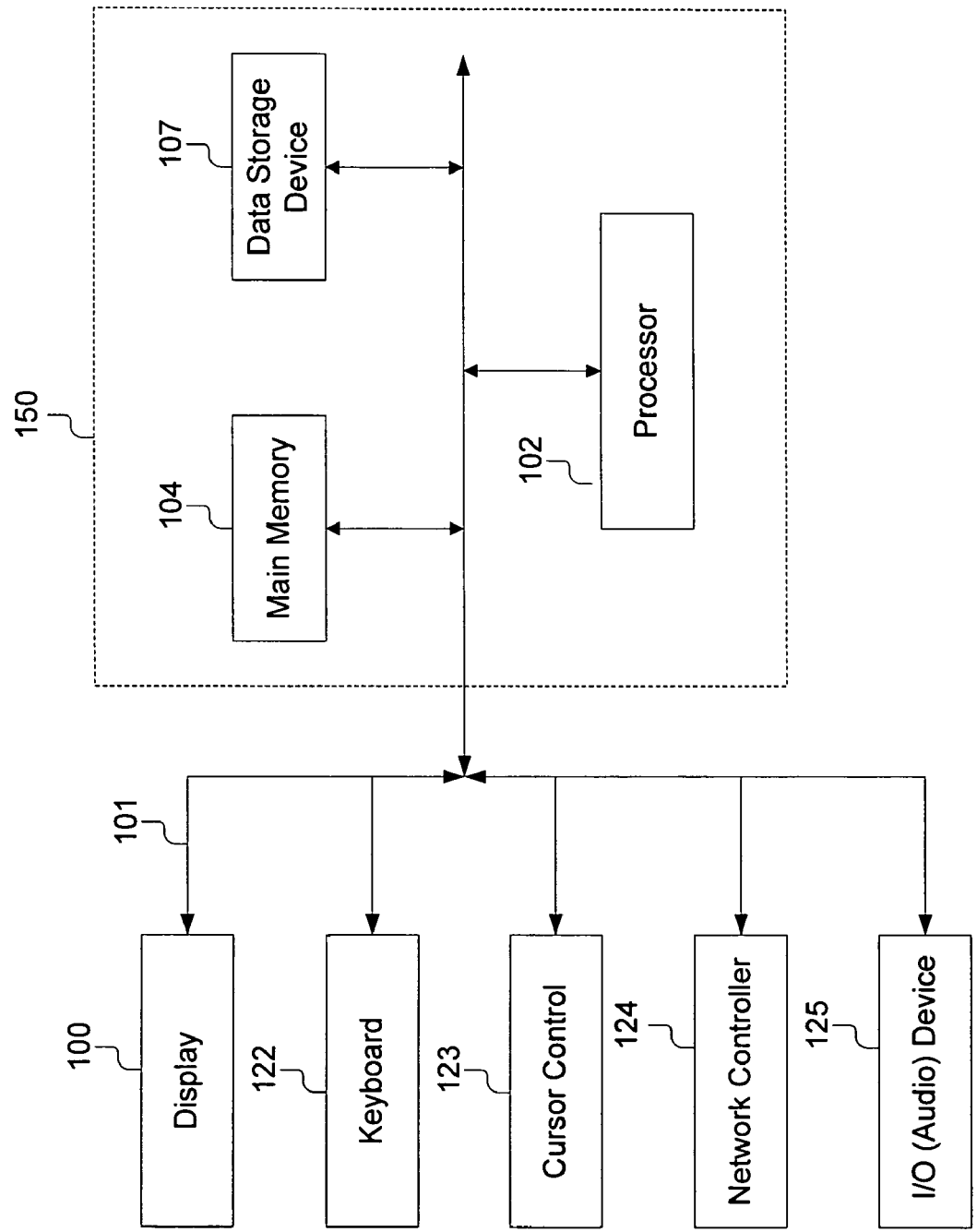
FIG. 1A is a block diagram of a system for operating the web analytics tool of the present invention according to one embodiment of the present invention.

While the present invention is described in the context of web analytics tools, those skilled in the art will recognize that the present invention may have various other applications, such as a user interface for viewing data from multiple queries on data stores. The context in which the present invention is described is only for convenience and ease of understanding, and not to limit the scope of the present invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

In the course of purchasing an item from an online retailer, a visitor/customer generally follows a basic path. The visitor enters a website (by, for example, typing the URL for the website, or selected from a Favorites menu, or clicking on a link) and is presented with a home page for the online retailer. During the process, the visitor generally is presented with an item description. If the visitor wants to buy the item, he or she clicks on an "Add to Cart" link and navigates to a Checkout page and then to a page for entering billing and shipping information. After entering such information, the visitor generally is presented with a confirmation page where he or she is given the opportunity to review the order and finalize it before exiting the website. Analysis of visitor navigation through such sequence is extremely valuable to website administrators.

Techniques for collecting site path sequences are known in the art. A particular visitor is recognized as he or she moves from page to page; the mechanics of visitor tracking are known in the art and need not be described in detail here. Visitor/customer web page visit records are stored in sequence according to they time that they occurred. Each visitation record typically contains two types of information: an identifier of the page visited, and metadata that provides further criteria for filtering and analyzing the sequential data.

In some contexts, certain elements of the visitor navigation are designated as "checkpoints," meaning that they are of importance in analyzing website visitation paths. Generally, all instances of a particular sequence of checkpoints are considered to be equivalent, regardless of the presence or absence of any other (non-checkpoint) nodes within the sequences. Greater detail regarding the use of checkpoints can be found in co-pending U.S. patent application Ser. No. 10/609,008, filed Jun. 27, 2003 by Brett Error et al., entitled "Capturing and Presenting Site Visitation Path Data," which is incorporated herein by reference.

In one embodiment, the system automatically designates certain nodes as checkpoints based on particular characteristics, location, name, popularity, or any other factor. For example, the home page, and/or the five most popular pages, can automatically be designated as checkpoints. These automatic, or default, checkpoints can, in one embodiment, be used to construct an initial target path.

It is within this context that the description of one embodiment present invention is described herein.

Figure 9:
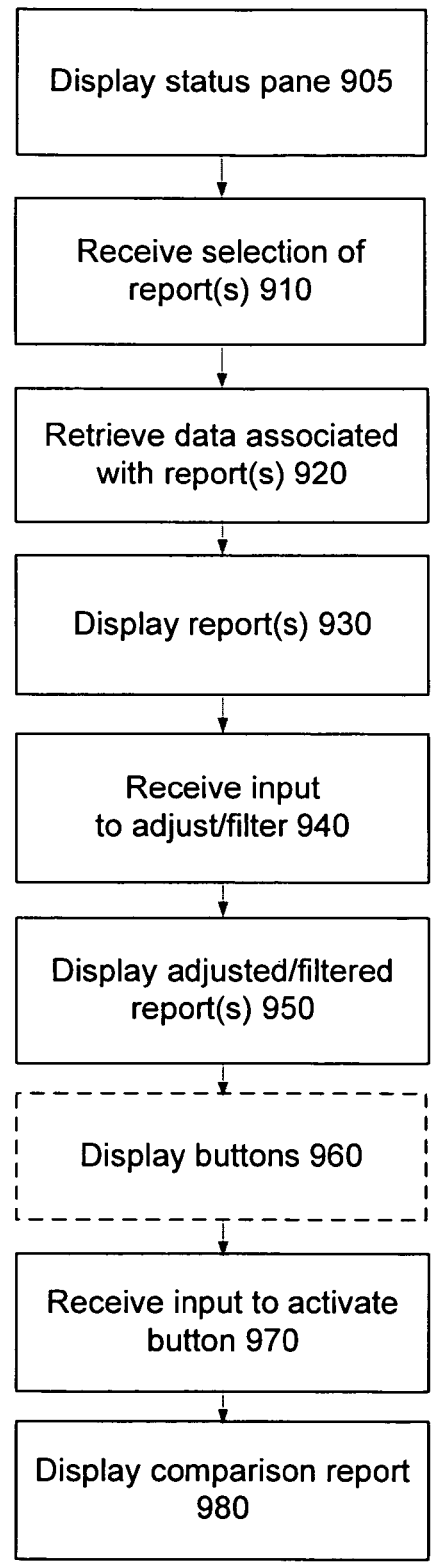
FIG. 9 is a flowchart illustrating a method of incrementally adding segmentation criteria to a data set according to one embodiment of the present invention.

FIG. 9 is a flowchart illustrating a method of incrementally adding segmentation criteria to a data set according to one embodiment of the present invention.

The process begins by displaying 905 a status pane. In various aspects of the status pane, the user can interact with the pane and report windows according to well known interaction techniques for window-based operating systems. In one embodiment, the number of rows can be edited, the user can drag edges to change the height and width, as well as minimize, delete, and maximize the windows, reposition/rearrange windows on the canvas by dragging the window title bar, and drag the column margins to resize column width.

Then user input is received 910 to select one or more defined reports for viewing. In one embodiment, the user initiates this step by clicking on a user interface control such as a reports button.

Next, the system retrieves 920 a data set associated with the one or more defined reports, for example comprising website visitation data. In one embodiment, this is accomplished by sending report queries to a network, and receiving report data from the network corresponding to the queries. The network replies, in one embodiment, with coded or uncoded data. In this embodiment the retrieval includes interpreting the data, for example using hash codes/meanings stored, e.g., in local cache.

After retrieval 920, the system displays 930 the one or more defined reports. In one embodiment, each report displays a set of default metrics, and the data are sorted by that metric. For example, an initial default metric may be visits to a website, although this can be customized by the user via an options screen. In one embodiment, the user can customize the default metrics on a per-report basis, for example by changing, adding, or deleting metrics.

In one embodiment, preprogrammed default metrics include Page Views; Visits; Hourly, Daily, Weekly, Monthly, Quarterly, or Yearly Unique Visitors; Revenue; Orders; Units; Cart Opens, Adds, Removes, and Views; Checkouts; Custom Events; Occurrences (the Product View, Campaign Clickthru, instance equivalents); and Participation Metrics.

Initially, the report shows a default number of data rows (such as 10), although the user can adjust the default number as desired. In various embodiments, the reports are standard, preset reports associated with a set of predefined filters; user-customized reports built during a current session; previously customized reports retrieved from storage; or fall-out reports.

In some embodiments, various views of the report data are available. For example, types of views include tended, improved, ranked, over time, fall-out, C&A, graphical, Gantt, tabular, raw data, and flexible. Some reports also include a search field that allows the user to search for and view entries for specific keywords or phrases.

When a user desires to filter a report, the system receives 940 user input to adjust segmentation criteria for/filter the report. In various embodiments, the adjustment/filtering includes adding segmentation criteria; removing pre-existing segmentation criteria; adjusting a date range; creating a new segmentation criterion; and activating a contextual menu of options for the segmentation criteria.

The user can filter a report by various means. For example, the user can click on an icon ("funnel") adjacent to the desired filter criterion. In one embodiment, clicking on a funnel icon causes the filter to be applied as an "OR Visits where [dimension]=[selected item]" parameter. In one embodiment, the user can shift-click to apply the filter as an "AND" criterion. In one embodiment, the user can right-click to see a menu of options for applying the filter. The icon acts as a toggle in one embodiment, switching between activating and deactivating the criterion depending on its current state.

According to one embodiment, elements of the displayed reports are themselves user input elements for specifying filters. Thus, the user can click on an area (such as a line) within a tabular report to apply a filter that corresponds to the data item being displayed in that area.

Next, the system processes the selected criteria, displaying 950 one or more adjusted/filtered reports. In one embodiment, each report is adjusted according to the segmentation criteria/filter applied. In one embodiment, the adjusted/filtered reports are displayed virtually instantaneously following the user input to adjust the segmentation criteria. In one embodiment, sampling rate for reports is selected based on requested date range, available RAM and other technological considerations.

As part of this process that system also may store the reports. A user can save and later re-open a project. When a user saves a project, the data set, filters, reports, and canvas appearance are all preserved. Subsequently, when the user opens the saved project, everything looks exactly as he or she left it.

After adjusted/filtered reports are displayed 950, one or more selectable buttons are displayed 960 according to one embodiment, which provide access to additional windows or panes of information in one embodiment. In one embodiment, the buttons include buttons for a summary report, a totals report, a commerce report, a web traffic report, and a paths report.

Next, user input to activate a comparison report is received 970, in response to which a comparison report is displayed 980. In one embodiment, the user input is in the form of clicking a selectable button. In one embodiment, the comparison report is displayed in a separate pane over a status pane, e.g., 402 of FIG. 4. The pane may have a variety of formats depending on the type of data being presented.

One skilled in the art will recognize that the present invention can be used in connection with any type of filtering criteria that can be specified by the user, and/or with any combination of such filtering criteria. Examples include the ordinal visit number (indicating whether this is the visitor's first visit, second visit, etc.), which particular pages were visited, time of day of the visit, geographic location of the visitor, web browser being used, whether or not the visitor is using a beta version of the browser, and the like.

FIG. 1A is a block diagram of one embodiment of the system. While the present invention will now be described in the context of a von Neumann architecture, is should be understood that one embodiment of the present invention divides functionality in a client/server architecture. Referring to FIG. 1A, the system is shown as including a control unit 150, a display 100, a keyboard 122, a cursor controller 123, a network controller 124 and an audio device 125. The control unit 150 is shown including processor 102, main memory 104, and data storage device 107, all of which are communicatively coupled to system bus 101.

Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1A, multiple processors may be included.

Main memory 104 may store instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art. The memory 104 is described in more detail below with reference to FIG. 2A. In particular, the portions of the memory 104 for providing the user interface for segmentation definition are shown in detail.

Data storage device 107 stores data and instructions for processor 102 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 101 represents a shared bus for communicating information and data throughout control unit 150. System bus 101 may represent one or more buses including an industry standard architecture (ISA) bus, a peripheral component interconnect (PCI) bus, a universal serial bus (USB), or some other bus known in the art to provide similar functionality.

Additional components coupled to control unit 150 through system bus 101 include display device 100, keyboard 122, cursor control device 123, network controller 124 and audio device 125. Display device 100 represents any device equipped to display electronic images and data as described herein. Display device 100 may be a cathode ray tube (CRT), liquid crystal display (LCD), or any other similarly equipped display device, screen, or monitor. Keyboard 122 represents an alphanumeric input device coupled to control unit 150 to communicate information and command selections to processor 102. Cursor control 123 represents a user input device equipped to communicate positional data as well as command selections to processor 102. Cursor control 123 may include a mouse, a trackball, a stylus, a pen, a touch screen, cursor direction keys, or other mechanisms to cause movement of a cursor. Network controller 124 links control unit 150 to a network that may include multiple processing systems. The network of processing systems may comprise a local area network (LAN), a wide area network (WAN) (e.g., the Internet), and/or any other interconnected data path across which multiple devices may communicate.

One or more I/O devices 125 are coupled to the system bus 101. For example, the I/O device 125 may be an audio device 125 equipped to receive audio input and transmit audio output. Audio input may be received through various devices including a microphone within audio device 125 and network controller 124. Similarly, audio output may originate from various devices including processor 102 and network controller 124. In one embodiment, audio device 125 is a general purpose; audio add-in/expansion card designed for use within a general purpose computer system. Optionally, audio device 125 may contain one or more analog-to-digital or digital-to-analog converters, and/or one or more digital signal processors to facilitate audio processing.

It should be apparent to one skilled in the art that control unit 150 may include more or less components than those shown in FIG. 1A without departing from the spirit and scope of the present invention. For example, control unit 150 may include additional memory, such as, for example, a first or second level cache, or one or more application specific integrated circuits (ASICs). Similarly, additional components may be coupled to control unit 150 including, for example, image scanning devices, digital still or video cameras, or other devices that may or may not be equipped to capture and/or download electronic data to control unit 150.

Figure 1B:
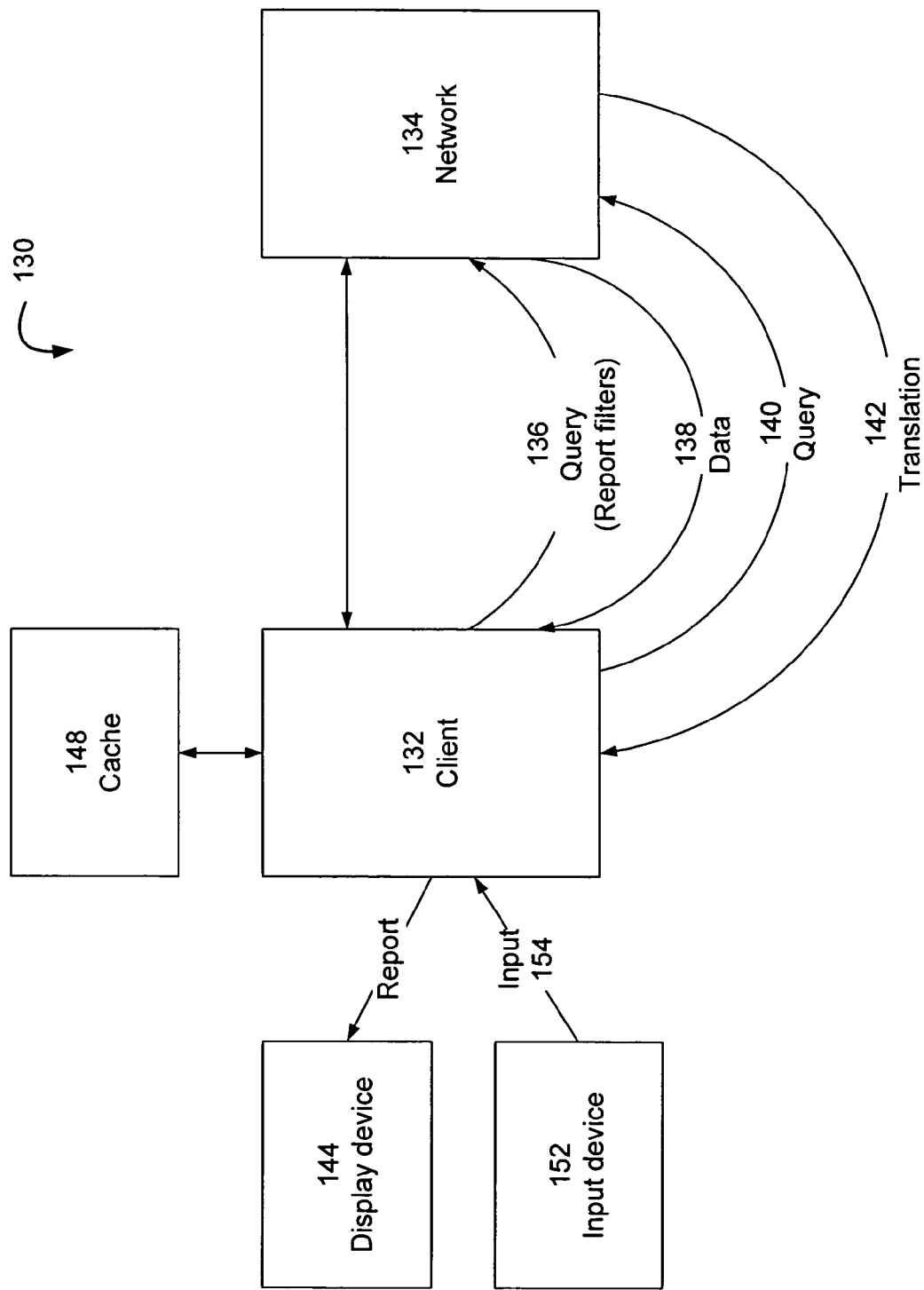
FIG. 1B is a block diagram illustrating a system useful for incrementally adding segmentation criteria to a data set according to one embodiment of the present invention.

Referring now to FIG. 1B, there is shown an example of a system 130 useful for practicing the present invention according to one embodiment. One skilled in the art will recognize that the invention can be practiced using other embodiments that differ from the examples shown.

The system 130 includes a client 132, a network 134, and optionally a cache 148, for incrementally adding segmentation criteria to a data set. The client 132 includes software including of a number of executable code portions and data files. These include code for viewing and interacting with website usage reports according to one embodiment of the present invention, as well as for supporting functionality of a user interface, as will be described in greater detail in conjunction with FIG. 2AB.

Client 132 is responsible for orchestrating the processes performed according to the methods of the present invention. For example, client 132 receives input 154 from an input device, and sends reports to display 144 (or other output device) for output to the user. Client 132 runs on a standard personal computer.

Figure 3A:
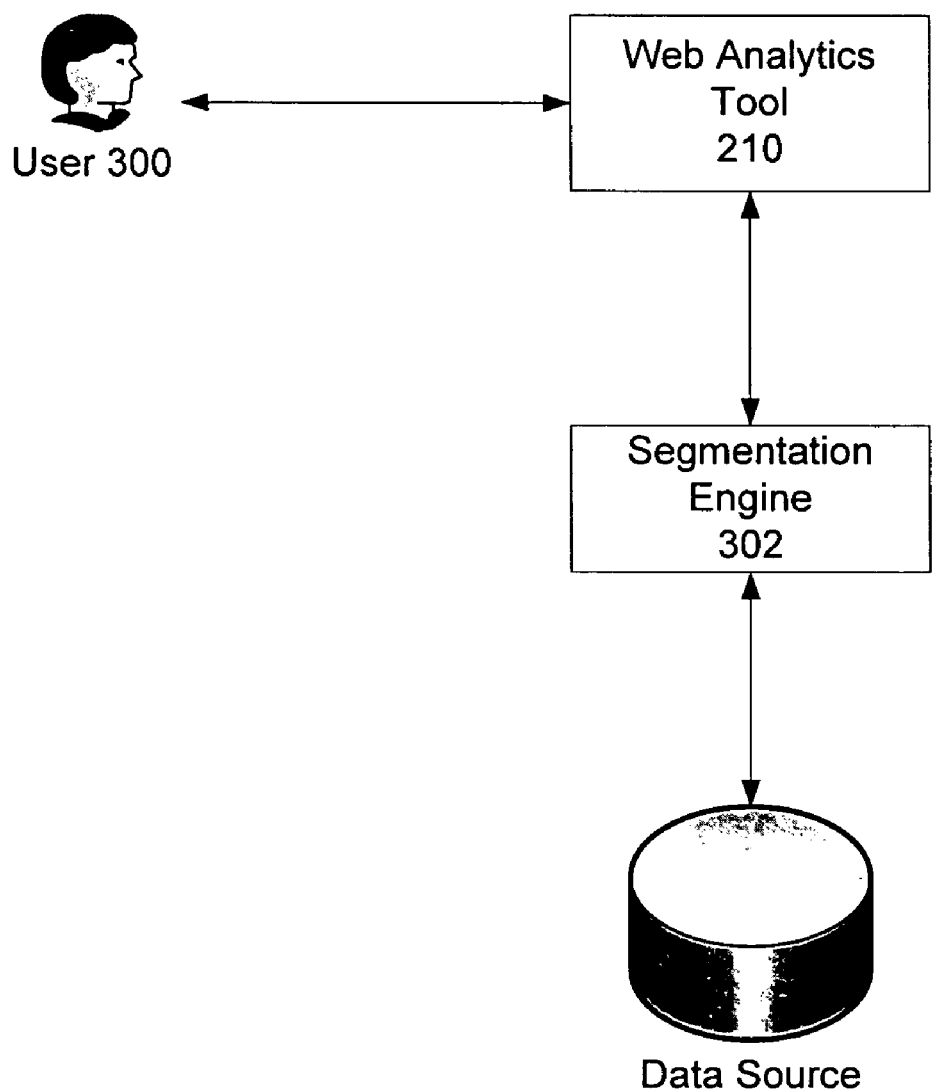
FIG. 3A is a block diagram representation of the interaction of the present invention in a web analytics system according to one embodiment of the present invention.

Network 134 is a centralized network for handling and responding to client requests for data on website usage, as described further in conjunction with FIG. 3AB.

A cache 148, if present, is a standard cache of small, fast memory holding recently accessed data. The cache 148 may include, for example a list of hash codes/meanings for report data as described below.

In one embodiment, the components shown in FIG. 1B operate as follows. When a user requests one or more reports via an input device 152, client 132 receives input 154 to this effect. Client 132 sends a query 136 to network 134, specifying which reports are requested, and optionally specifying one or more filters for the reports. In one embodiment, query 136 is in XML format.

In response to query 136, network 134 returns data 138 that contains a representation of the report data. Data 204, in various embodiments, may be coded or not, and may be hashed data or may be included in a standard look up table. For example, data 138 may specify, in hash coded terms, the text string name of an item in a report. This data 138 is received by client 132.

Client 132 stores, e.g., in local cache 148, a list of previously received and decoded hash codes/meanings, so that it can correctly interpret a data that it has encountered previously. In one embodiment, local cache 148 is cleared at the end of a session, so that only those codes/meanings previously received in the same session are stored. In other embodiments, local cache 148 is implemented in a more persistent or less persistent fashion, depending on user needs.

Upon receiving data 138, client 132 consults a storage, e.g., cache 148; if storage contains the hash code(s)/meaning(s) in data 138 (in other words, if client 132 has previously received data containing the same code/meaning), client 132 can interpret the meaning of the data without any further communication with network 134. For example, a hash code/meaning may specify that hash term #299 signifies a visitor using Internet Explorer 6.0. If hash code(s)/meanings from data 138 is/are not present in cache 148, client 132 sends query 140 to network 134; network 134 responds by sending translation 142 to client 132. Hash 142 provides client 132 with the meaning of terms. In one embodiment, client 132 stores this meaning for future use.

Once client 132 has received sufficient data to generate a report, it sends report to display 144 for output to the user. In one embodiment, if some meanings have not yet been received, client 132 still sends report, and report states that certain terms are unknown. In another embodiment, client 132 displays an error message and/or waits until more complete meaning data is available.

The user can interact with the displayed report via user input device 152 such as a mouse, keyboard, or the like. The user can click on areas within report; when the user clicks on an area that can be interpreted as a filter, client 132 generates and sends a new query 136 containing the new report filter criteria. The above process then repeats, and an updated report is sent to display 144.

Figure 2A:
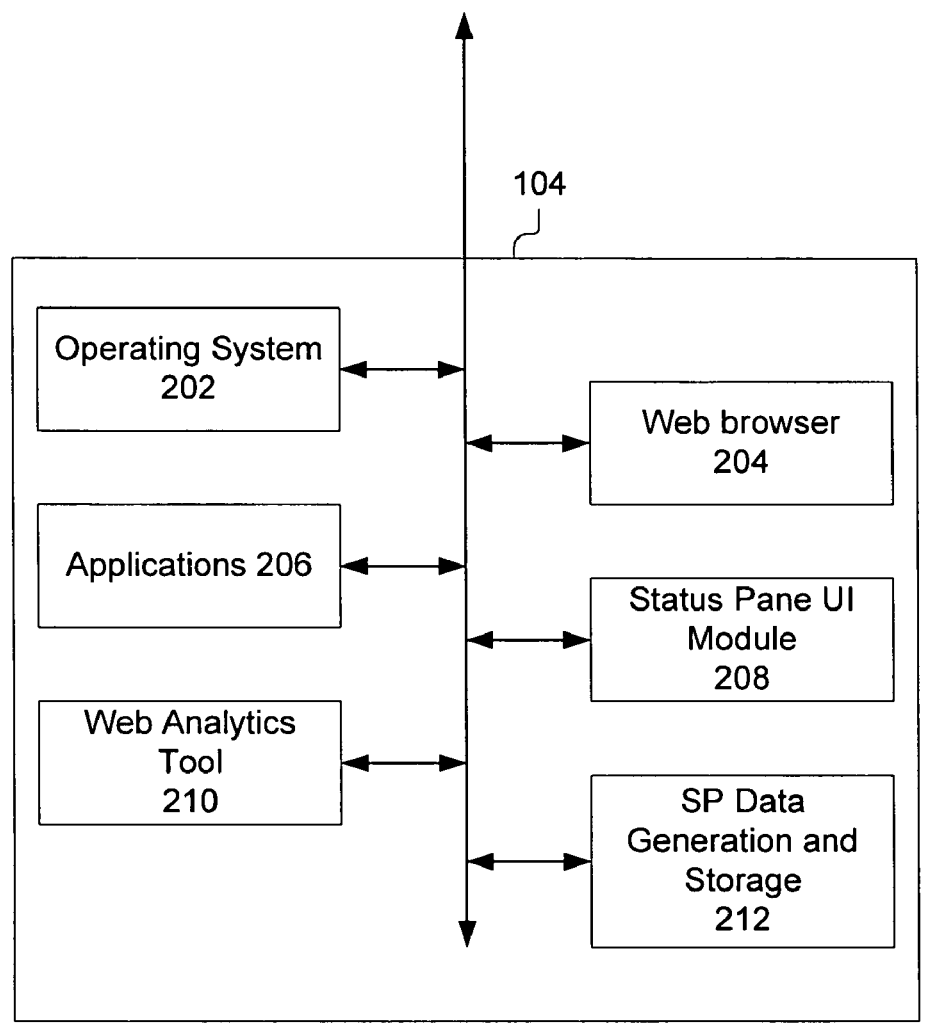
FIG. 2A is block diagram of one embodiment of the memory of the system of FIG. 1A according to one embodiment of the present invention.

FIG. 2A illustrates one embodiment of memory 104 of the present invention including operating system 202, a web browser 204, applications 206, a status pane user interface (UI) module 208, a web analytics tool 210, and a status pane (SP) generation and storage module 212.

The operating system 202 is in one embodiment one of a conventional type such as, WINDOWS®, SOLARIS® or LINUX® based operating systems.

The web browser 204 is of a conventional type that provides access to the Internet and processes HTML, XML or other mark up language to generate images on the display device 100. For example, the web browser 204 could be Mozilla Firefox or Microsoft Internet Explorer.

The memory unit 104 also includes one or more application programs 206 including, without limitation, word processing applications, electronic mail applications, spreadsheet applications, and web browser applications.

The memory also includes a web analytics tool 210 such as Site Catalyst version 11 from Omniture of Orem, Utah. Such a tool 210 is disclosed in co-pending provisional patent application titled "Website Traffic Analysis Engine and User Interface," Ser. No. 60/688,076 by Catherine Wong et al., filed Jun. 6, 2005, which is incorporated by reference in its entirety.

The status pane user interface (UI) module 208 is a module and routines for the generation of panes or windows as well as buttons and/or other attributes for user interaction with the web analytics tool 210. The display generated by the status pane UI module 208 is shown in more detail below with reference to FIGS. 4-8. The status pane UI module 208 generates status data to provide the user with information regarding the filter that is being applied to the data. A key aspect of the present invention is the activation of the status pane showing a summary comparison of data, either filtered and unfiltered data, or two different sets of filtered data. The status pane UI module 208 provides a status pane or window of the comparison that may be presented to the user in conjunction with the filtered data or displayed over the filtered data according to one embodiment. The data in the status pane is dynamically updated depending on the filter the user has chosen to apply.

The status pane (SP) generation and storage module 212 includes routines and memory for generation and storage of unfiltered and filtered data, one or more templates or forms for the status pane presented to the user, and configuration information. In one embodiment, a single template is stored and it is populated with data from the data set being used by the web analytics tool 210. In an alternate embodiment, the template presented and populated with data is dependent on the context in which the user is viewing the data. In yet another embodiment, the template used is dependent on configuration information that the user has provided.

The SP generation and storage module 212 advantageously regenerates the data in the status pane any time the user applies different filters or modifies the data segments being viewed. Thus, the status pane will be in sync with the data the user is viewing and provides a high level or summary view of the data. As noted above, the status pane shows both the filtered and unfiltered data, or two different sets of filtered data, thus the SP generation and storage module 212 must maintain current data to match the screen the user is viewing. The SP generation and storage module 212 is coupled to the status pane UI module 208 to provide the data that is displayed and also receives data indicating what filters are being applied.

Although the SP generation and storage module 212 and the status pane UI module 208 have been described above as separate modules in memory 104, they may reside or operate either at the client or at the server. Moreover, although shown as separate modules, they may be incorporated into the work bench that is a part of the web analytics tool 210.

Figure 2B:
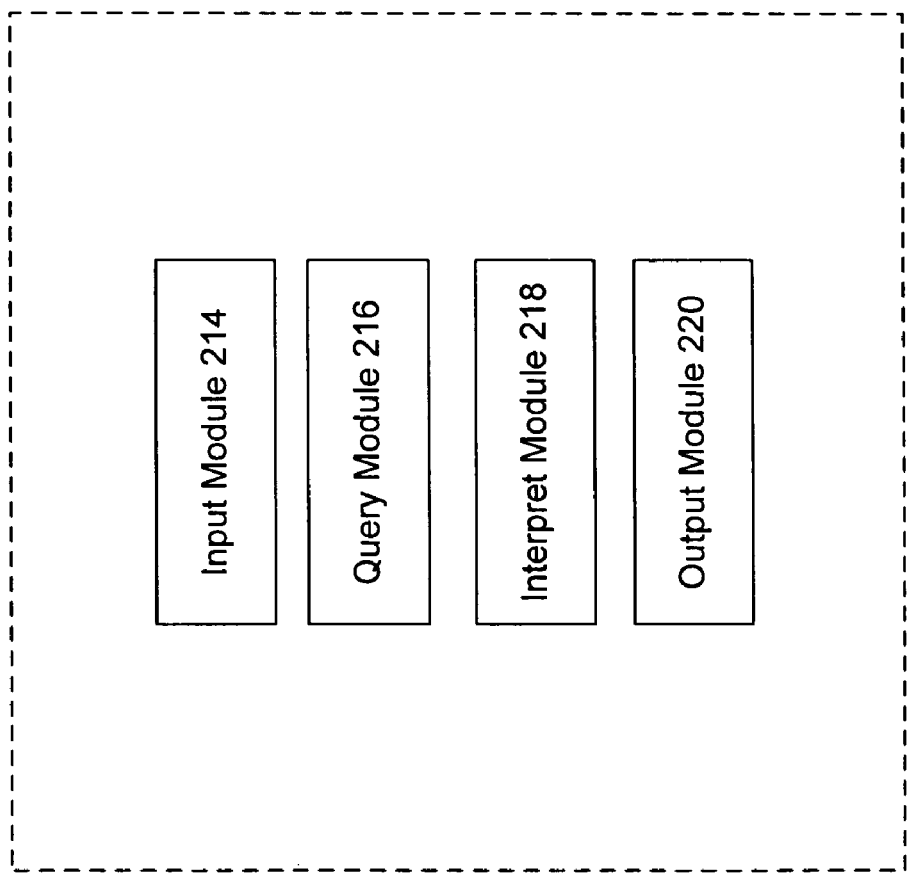
FIG. 2B is a block diagram illustrating software modules used by a web analytics tool according to one embodiment of the present invention.

FIG. 2B is a block diagram illustrating software modules used by a client according to one embodiment of the present invention. The modules include of a number of executable code portions and data files. These include code for creating and supporting a user interface according to one embodiment of the present invention, as well as for supporting incrementally adding segmentation criteria to a data set. The modules may be included, for example in the client 132 of FIG. 1B or as part of the memory 104 of FIG. 1A. The modules include an input module 214, a query module 216, an interpret module 218, and an output module 220.

The input module 214 is configured for receiving input to select one or more reports; receiving input to adjust segmentation criteria for one or more reports; receiving input to adjust one or more metrics; and receiving input for adjusting various aspects of displayed data. Thus, when a user requests one or more reports via an input device, the input module allows the client to receive input to this effect.

The query module 216 is configured for retrieving a data set comprising website visitation data associated with one or more reports; sending report queries to a network and receiving report data from the network corresponding to the queries; storing adjusted reports as one of the one or more defined reports. In one embodiment, when user input is received to filter the reports, a new query is generated and sent, repeating the process.

The interpret module 218 is configured for, in response to receiving data from the network, interpreting the data. In one embodiment, the interpret module 218 uses hash codes or meanings stored for this purpose. If hash codes/meanings are not present, for example in local cache, in one embodiment the interpret module 218 sends a query to the network, and receives back a translation providing the meaning of the term(s).

The output module 220 is configured for displaying one or more defined reports; displaying one or more (singly or multiply) adjusted reports, each adjusted according to segmentation criteria; displaying one or more twice-adjusted reports, each adjusted according to the segmentation criteria. In one embodiment, the output module 220 sends reports to a display device for output to the user.

The above software portions 214-220 need not be discrete software modules. The software configuration shown is meant only by way of example; other configurations are contemplated by and within the scope of the present invention.

Referring now to FIG. 3A, a block diagram showing the interaction of the components of present invention in a web analytics system will be described. A user 300 interacts with a status pane of a web analytics tool 210. As noted above, the SP generation and storage module 212 and the status pane UI module 208 can be part of the web analytics tool 210 or operate in conjunction with it. The segmentation engine 212 uses the segment definition along with instructions to create a data set by applying the segmentation definition to the data source. The data set can then be further manipulated by the web analytics tool 210 for the creation of reports, display to the user, tracking, targeting and notification of users based on the data. During such manipulations, the SP generation and storage module 212 and the status pane UI module 208 generate and store data, and make available the interfaces shown below with reference to FIGS. 4-8.

Figure 3B:
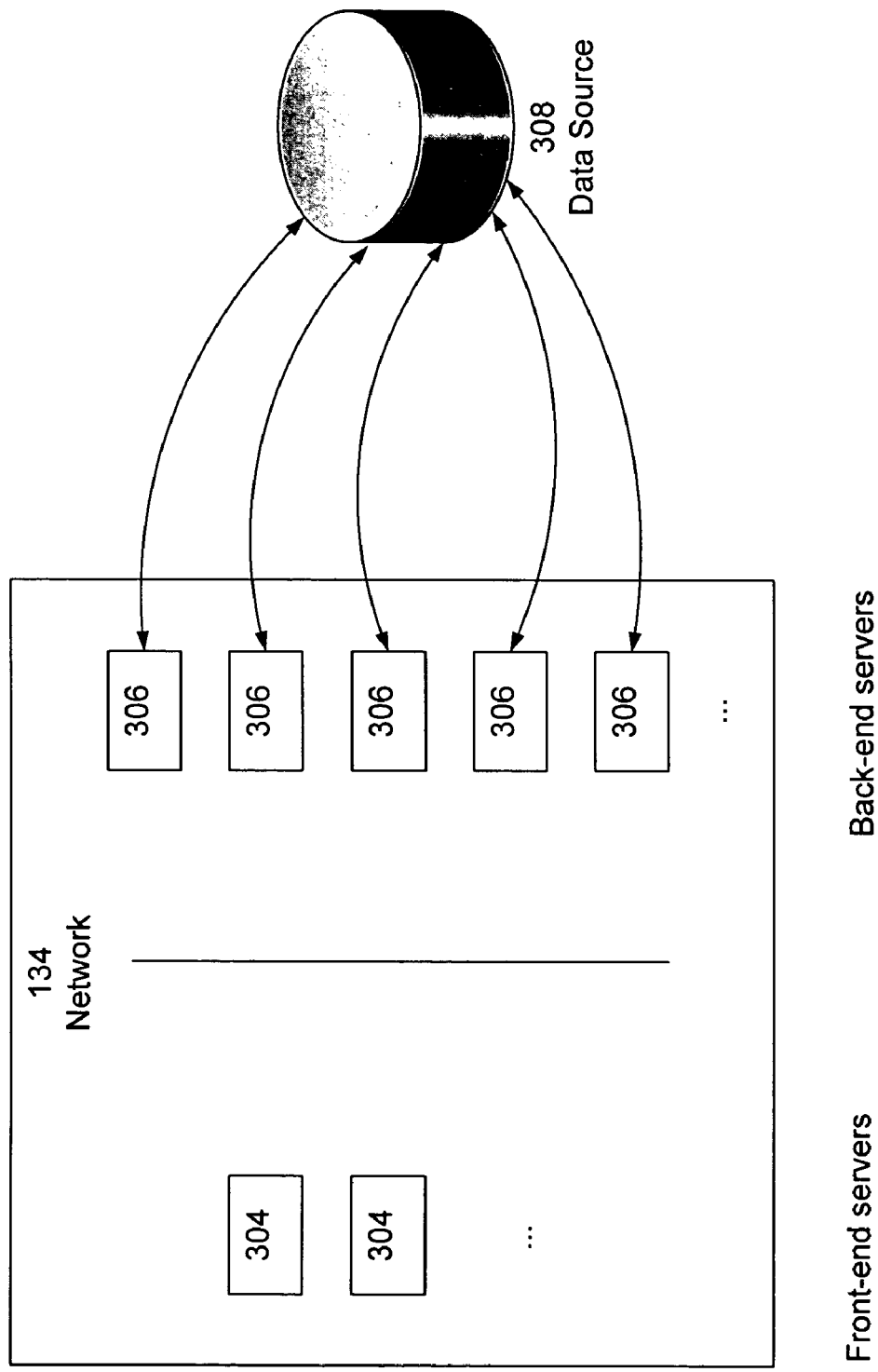
FIG. 3B is a block diagram illustrating an architecture for a web analytics tool network according to one embodiment of the present invention.

Referring now to FIG. 3B, there is shown an example of an architecture for the network 134 of FIG. 1B according to one embodiment. Network 134 includes any number of front-end web servers 304 that receive queries 136, 140 from client 132, and any number of back-end servers 306 that obtain data from storage, e.g., from database 308, analyze the obtained data, and send report data back to client 132. Servers 304, 306 are computers or devices that send and receive information using well known network protocols, such as TCP/IP and HTTP, for communication across a network. Back-end servers 306 send an appropriate data set to client 132 based on the filter request. For example, if a filter request specifies that the user is only interested in visitors that used a particular web browser, back-end servers 306 remove the data that does not match the specified criterion, and only forward to client 132 the data that does match. Conceptually, back-end servers 306 are applying a movable filter bar to the data set, maintaining consistency in the views into the data while changing the size of the data set according to the filter request.

Database 308 may be a relational database or any other type of database that stores the data used by client 132. Database 308 may be accessible by client 132 through a user interface, e.g., as described in conjunction with FIGS. 3A-3G.

Database 308 contains website visitation data, which in one embodiment is stored in a binary format stored in some storage medium such as a hard drive. In one embodiment, the website visitation data is broken up into files, or "bricks," to facilitate extraction of portions of the data. When servers 306 extract data from database 308, they are provided with specific bricks that match the criteria.

In one embodiment, when the user requests a report showing website visitation data for a specified time period, back-end servers 306 extract data from database 308 that contains web visitation logs and/or statistics. In one embodiment, servers 306 obtain data from database 308 that represents a snapshot of website visitation over a specified time period. Servers 306 and then apply filters as requested, and send the filtered data to client 132.

In one embodiment, whenever the user requests a broader date range for website visitation data, back-end servers 306 perform a new data extraction from database 308. However, when the user narrows the date range from a previously specified range, no new data extraction is performed; rather back-end servers 306 filter the previously extracted data according to the new filter parameters.

User Interface

Referring now to FIGS. 4-8, the user interface or status pane 402 will be described in detail.

Figure 4:
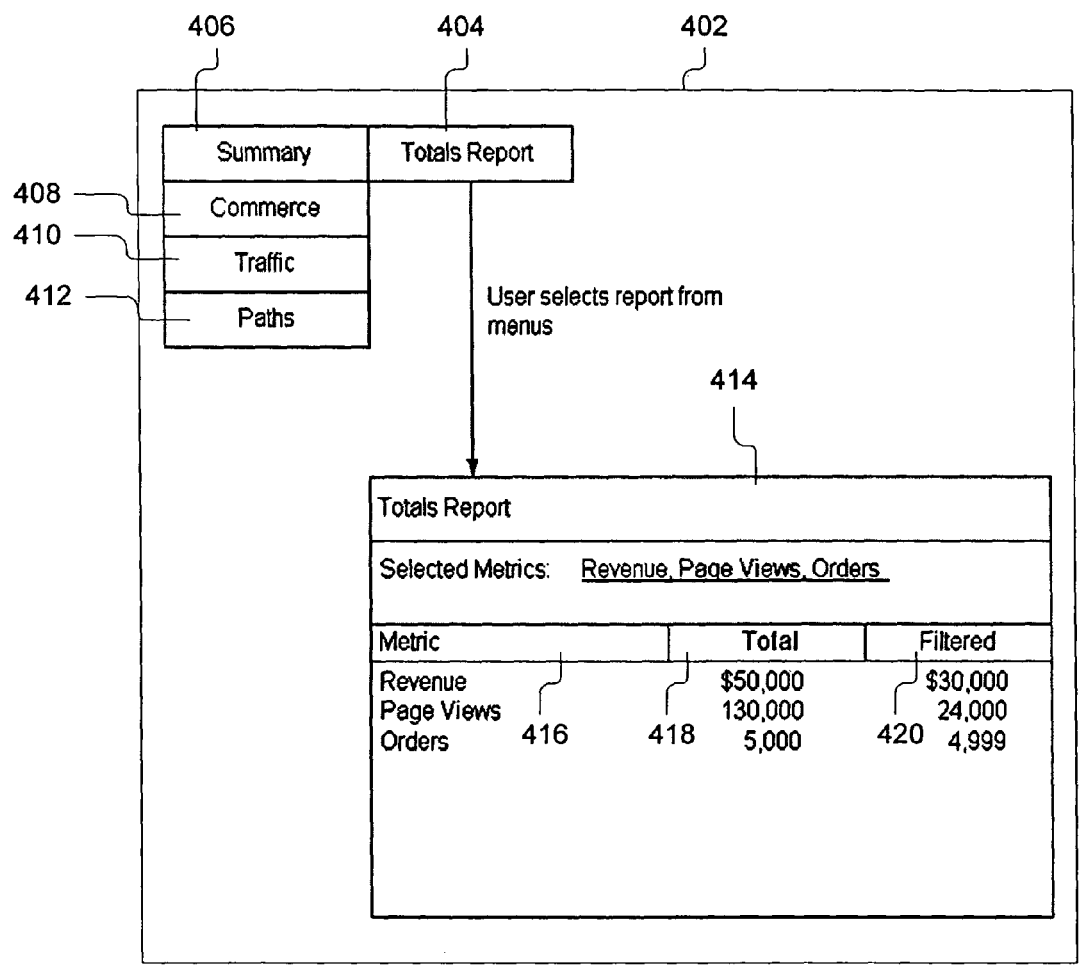
FIGS. 4-8 are graphical representations of the graphical user interface of the present invention according to several embodiments.

The interface 402 produced by the status pane UI module 208 is a visual representation of key summary attributes that the user can select to view. As shown in FIG. 4, the status pane 402 includes a plurality of selectable buttons 404-412 that provide access to additional windows or panes of information. For example, as shown in FIG. 4, the plurality of buttons includes 404-412: a button 406 for summary report, a button 404 for a totals report, a button 408 for a commerce report, a button 410 for a web traffic report, and a button 412 for a paths report. While this status pane 402 is shown as including buttons 404-412 that are selectable by the user by clicking on the button 404-412 with a mouse-type cursor, they may alternatively be automatically activated when the cursor is positioned ("hovered") over them to automatically pop up the corresponding report. Those skilled in the art will recognize that while FIG. 4 shows one configuration of the buttons in the upper left corner of the status pane 402 in a inverted "L" configuration, the buttons 404-412 may be placed at a variety of other locations about the periphery of the status pane 402.

As indicated by the arrow in FIG. 4, upon selection of a button 404 such as the total report button 404, another pane 414 is presented in the status pane 402. The other pane 414 is the report corresponding to the button 404-412 selected. The other pane 414 may have a variety of formats depending on the type of data being presented. In one embodiment as shown, the other pane 414 is placed over any data that may already be presented to the user. In another alternate embodiment, portions of pane 402 not displaying data are used to present the other pane 414.

As shown in FIG. 4, the totals report 414 is particularly advantageous for a number of reasons. First, it provides a comparison of the total values 418 for the web metrics 416 presented to the filtered values 420 presented. Since the total values are not visible when the filter is applied this is advantageous because it shows the comparison very clearly. Second, the metrics 416 are selectable by the user. For example, the metrics 416 may include revenue, page views, and order as shown. However, these metrics are fully customizable by the user and may also include visitors, visits, browsers or any other metric in the data set. The customization may be done using a window where the entire set of metrics is presented, and the ones of interest are selected by the user for inclusion in the totals report or similarly for any other report.

In one embodiment, the data presented is the raw and filtered data with the same format as the data set. For example, if the metrics are in dollars or numbers they remain in the same data format and just show the data. In an alternate embodiment, the totals are always 100% and the filtered data is the percentage of that 100%. In another embodiment, in addition to the actual and filtered data, a third column is provided that gives the percentage difference between the two columns.

It should be noted the buttons 404-412 may alternatively provide a toggle function for the presence or non-existence of the other pane 414. In such a case, it should be noted that the data in the pane 414 is dynamic, and each time the user moves the cursor over another part of the pane 402 that has a filter applied to data, the data in the other pane 414 changes to match the position of the cursor.

Figure 5:
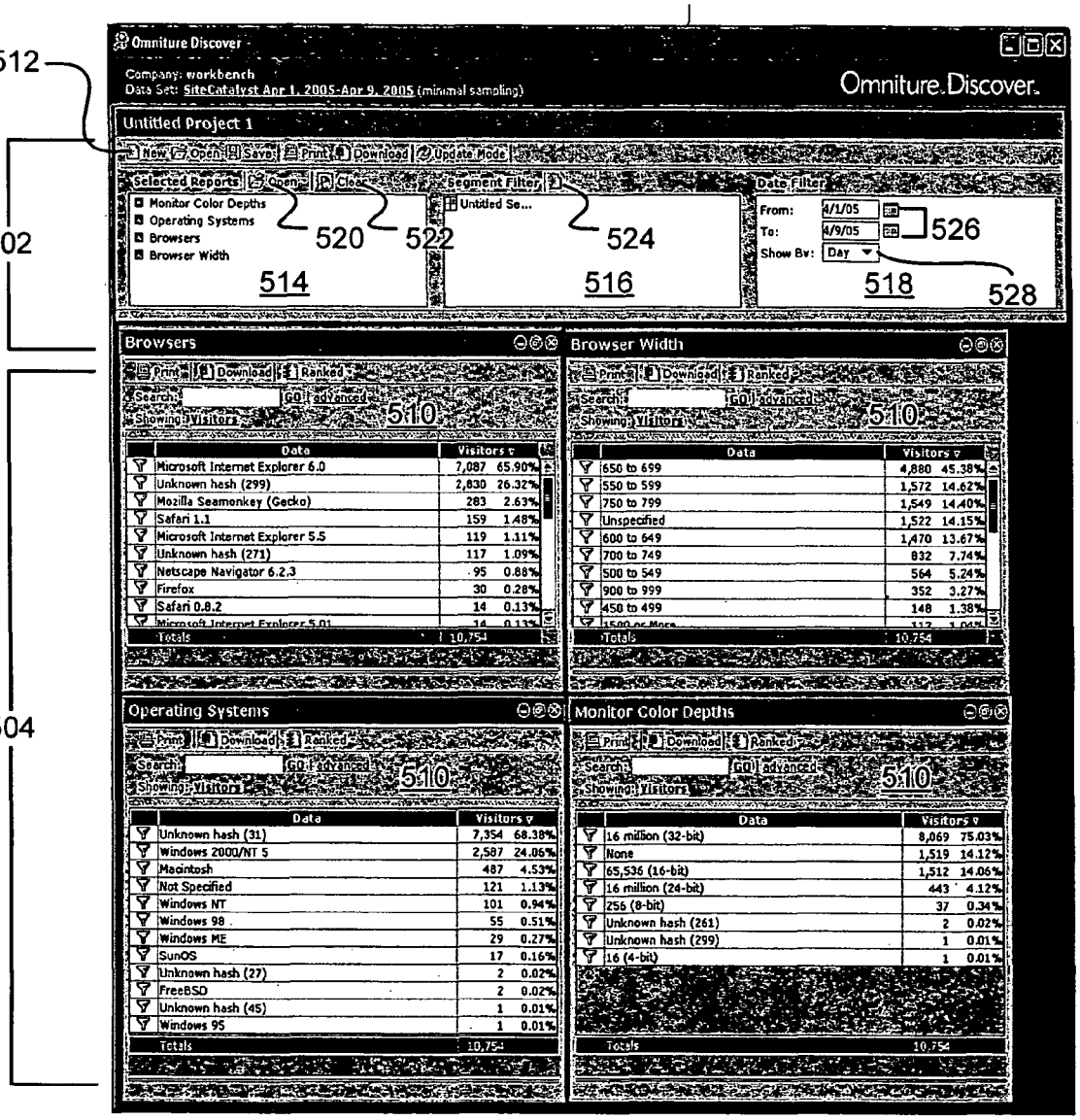

Referring now to FIG. 5, an exemplary pane 402 for data is shown without status information. In one embodiment, the user interface or pane 402 is implemented using a known environment such as Macromedia Flex, Java, DHTML, or any combination thereof.

The pane 402 includes an upper section 502 includes functionality for creating projects and reports and for displaying report statistics. The pane 402 also includes a lower section 504 that includes functionality for displaying and filtering reports 510. FIG. 5 shows a pane 402 with four reports 510, and initially, no filter is applied.

The upper section 502 further includes a project toolbar 512, a report selection area 514, a segment filter area 516, and a date filter area 518 according to one embodiment. The project toolbar 512 is a standard toolbar with icons for various functionalities such as creating a new project, opening an existing project, saving the project in use; printing the project, etc. The report selection area 514 lists reports 510 displayed in the lower section 504, and includes an open report button 520 and a clear button 522. The open report button 520 allows the user to open an existing report. Once opened, the report name is added to the list in the report selection area 514, and the report 510 is displayed in the lower section 504.

The segment filter area 516 displays a textual description of the filters applied. Because the reports of FIG. 5 have no filters applied, no segmentation criteria are displayed. The segmentation filter area 516 also includes a new segment button 524 for manually adding segmentation criteria.

The date filter area 518 allows the user to filter the reports 510 by date, for example by selecting a date range for which the user would like to see the report data. The date filter area 518 includes to and from date selectors 526 and a show by selector 528. The to and from data selectors 526 allow the user to set start and end dates for the data displayed in the reports 510, either by typing in the desired dates or by clicking the calendar icon and selecting the dates on a calendar. The show by selector 528 allows the user to select the granularity of the report, for example, by day, week, or month.

The lower section 504 includes reports 510 chosen in the reports selection area 514.

Figure 8:
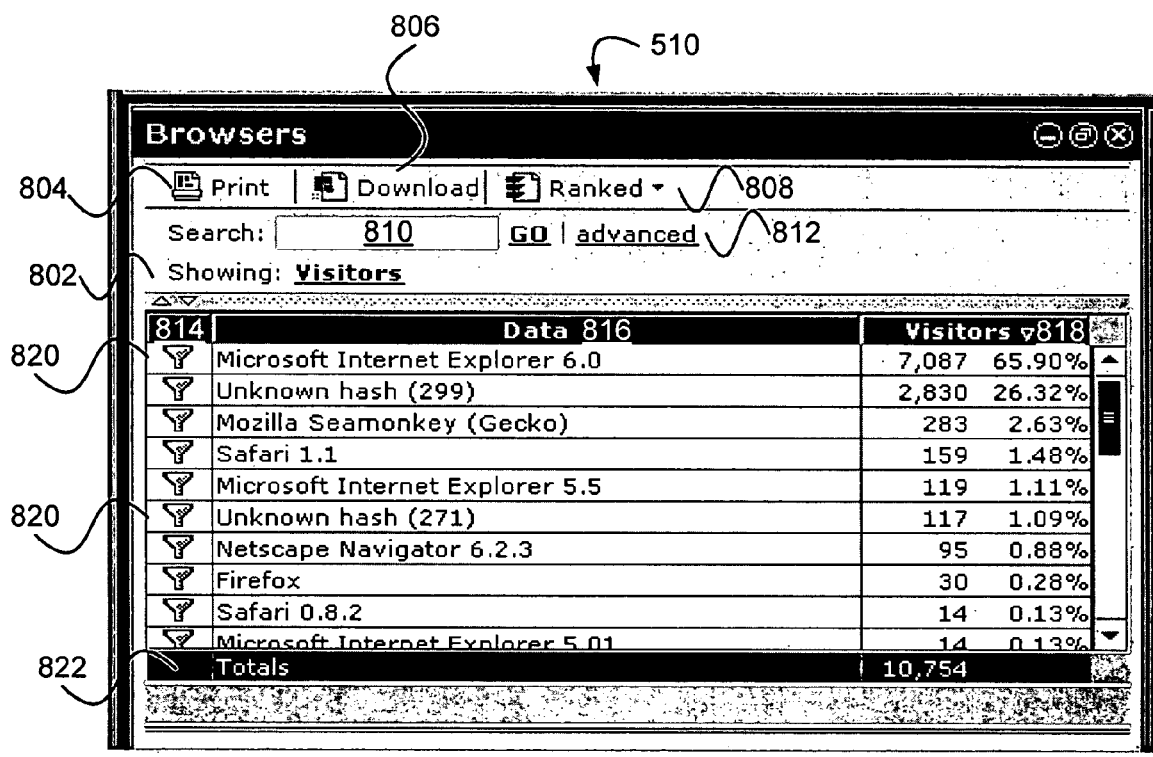

FIG. 8 illustrates a report 510 in greater detail according to one embodiment of the present invention. Each report 510 displays data corresponding to one dimension within the context of a larger data set, for example, website visitation data. For each report 510, data is sorted according to one or more default metrics 802. In this example, the default metric 802 is visitors (to the website). In another embodiment, the metric(s) used can be user defined.

Reports 510 include a set of standard function keys, including a print button 804, a download button 806, and view selector 808. The print button 804 allows the user to print online reports without having to first download the reports. Clicking the print button 804 opens a pop-up window with a printer-friendly version of the report.

The download button 806 allows the user to select the format in which to download the report (e.g., Word, Excel, PDF, HTML). Once the user selects a format, the report is sent to the user as an email attachment or is downloaded directly to the user's computer.

The view selector 808 allows the user to select various views of the report data. The Ranked view, shown in FIG. 8, is the default view for most reports, allowing the user to view report data in tabular format according to the selected time periods. Other views include Improved, which allows the user to see how selected items performed between previous and current time periods based on success metrics such as revenue of checkouts, and Trended, which allows the user to view report trends over a given time. The user may select other available views using the view selector 808 drop-down.

In one embodiment, reports 510 include a search field 810. A search field 810 allows the user to search for and view entries for specific keywords or phrases. As a result of clicking "go," the report displayed will be filtered by the entered search term. In addition an advanced search button 812 allows the user to search with greater specificity, for example, by choosing whether to search for the exact phrase, perform an "and" or "or" search using the search terms, or exclude entries with the entered search terms. In one embodiment, clicking the advanced search button 812 opens a pop-up window displaying these options.

Each report 510 is divided into columns, including a filter column 814, a data column 816, and one or more metric columns 818. The data column 816 includes a list of various forms of the dimension corresponding to the report 510. In the depicted example, the dimension is Browsers, thus various browsers, such as Microsoft Internet Explorer 6.0, Netscape Navigator 6.2.3, etc., are listed. The metric column(s) 818 includes statistics for the respective row's 820 data column 816. In the example depicted, for each browser (data column 816), the metric column 818 displays visitors by number and percentage of the whole.

Reports 510 display rows up to a pre-selected number for the user interface 402. In one embodiment, the number of rows can be edited. The user can interact with on-screen report windows according to well known interaction techniques for window-based operating systems. For example, the user can drag edges to change the height and width; minimize, delete, and maximize; reposition/rearrange windows on the canvas by dragging the window title bar; and drag the column margins to resize column width.

The filter column 814 of each row 820 includes an icon that allows the user to filter the data by that row 820. When a filter is selected, all reports 510 are filtered to reflect the filter. The filter column 814 icon acts as a toggle, narrowing or expanding the data depending on the present state of the data in one embodiment. Data may be further filtered if desired, and again all reports 510 are filtered by the additional criterion. In one embodiment, the filtering occurs virtually instantaneously. In addition, the rows are totaled in a totals row 822.

Figure 6:
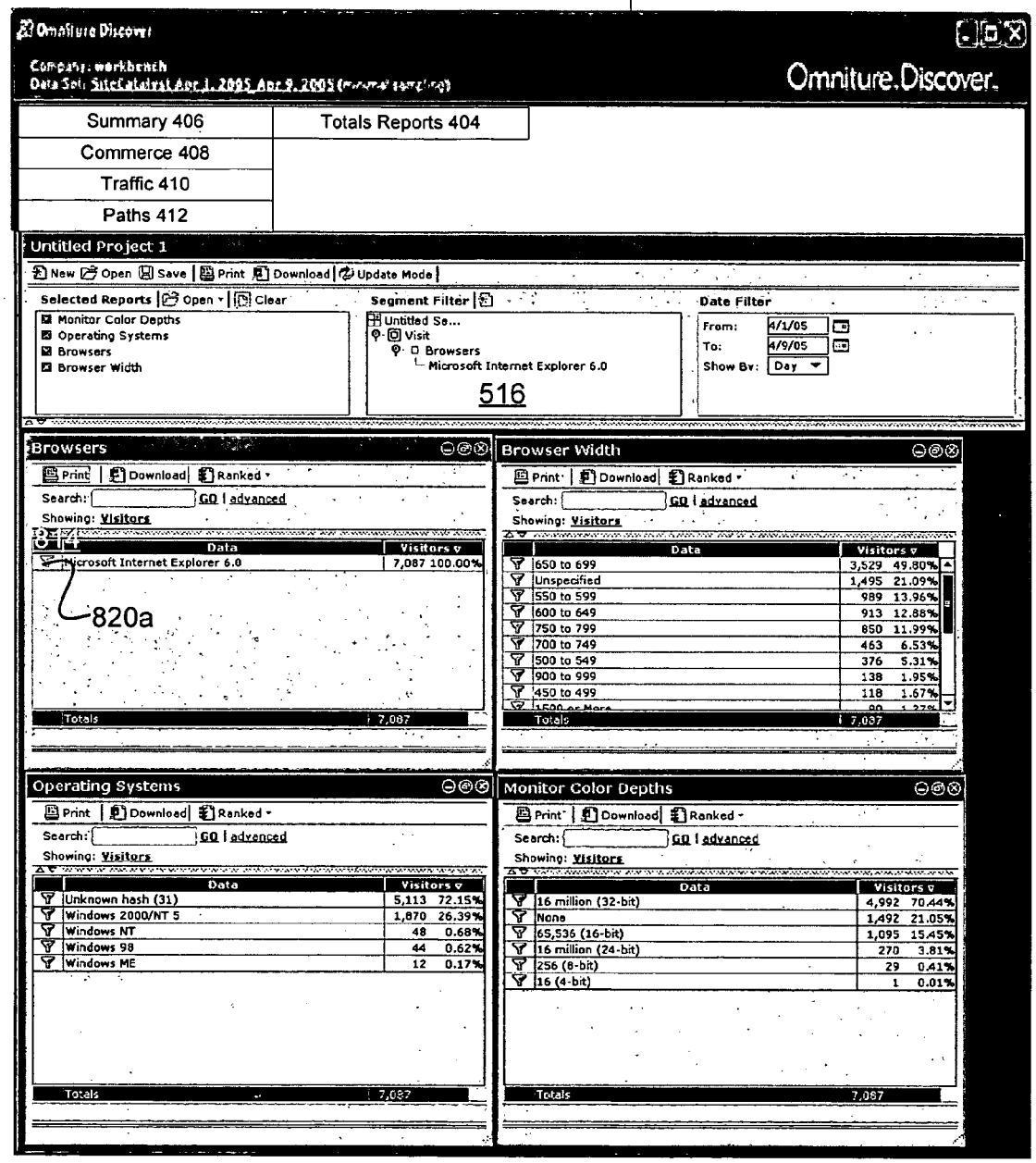

Referring now to FIG. 6, the pane 402 is shown after the user applies a filter on the "browser" report, via the row corresponding to Internet Explorer 6.0 (820*a*). As a result, the report 510 data is narrowed to only see visits from visitors using Internet Explorer 6.0. The filter is applied by clicking on the icon in the filter column 814 to the left of the data by which to filter. All reports now filter based on the criteria selected; thus the other three reports are only showing data where browser was I.E. 6.0. Note that text corresponding to the applied filter is not displayed in the segment filter area 516. Furthermore, the pane 402 now includes the buttons 404-412 as shown and described above with reference to FIG. 4. These buttons 404-412 provide the user with easy access to high level data.

Figure 7:
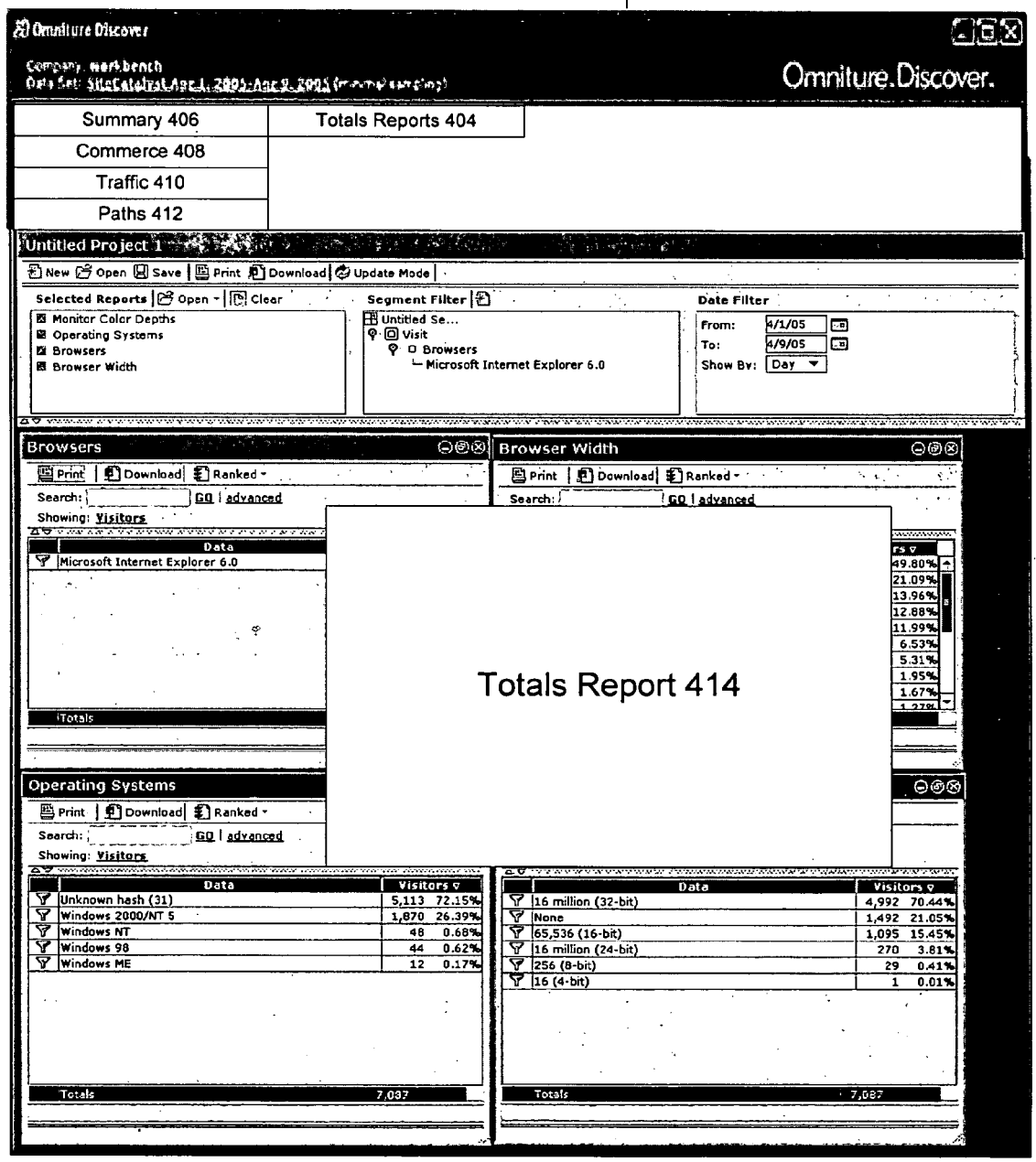

If for example the total reports button 404 is selected by the user, the SP generation and storage module 212 and the status pane UI module 208 produce another pane to present the totals report 414 as shown in FIG. 7. While the totals report is only shown as box in FIG. 7, it should be understood that it would have metrics and data corresponding to those metrics as set by the user or a default. The format for the totals report 414 may be similar to that shown in FIG. 4. This is particularly advantageous because these reports provide overall data about what the currently applied filter means.

While the present invention is shown as providing the data as an overlay in the same window, those skilled in the art will recognize how any of the reports corresponding to the buttons 404-412 may be provided in pop up windows, or windows adjacent (above or to the side) to the status pane 402.

While the present invention has been described with reference to certain embodiments, those skilled in the art will recognize that various modifications may be provided. For example, the user interface may employ color, graphics and Icons to distinguish different sections, panes or buttons. Variations upon and modifications to the embodiments are provided for by the present invention.

I claim:

1. A computer-implemented method for providing a comparison of various website visitation data, the method comprising:
    displaying a first report comprising website visitation data;
    in response to receiving user input to filter the first report based on filtering criterion, displaying a filtered report comprising filtered website visitation data corresponding to the filtering criterion; and
    in response to receiving user input to activate a comparison report, concurrently displaying:
        the filtered report in a first display area; and
        the comparison report in a second display area visually distinct from the first display area, the display of the comparison report comprising one or more rows of data each corresponding to a given metric, wherein each row of data comprises:
            a first set of website visitation data from the first report in a first column, wherein the first set of website visitation data comprises an unfiltered value for the given metric corresponding to the unfiltered website visitation; and
            a second set of website visitation data from the filtered report in a second column adjacent to the first column, wherein the second set of website visitation data comprises a filtered value for the given metric corresponding to filtered website visitation data; and
    in response to receiving user input to adjust the filtering criterion associated with at least one of the first report and the filtered report, dynamically updating the second set of website visitation data according to the adjusted filtering criterion and dynamically updating the display of the comparison report based on the updated second set of website visitation data.

2. The method of claim 1, wherein the first report comprises a first filtered report having a first set of filtered website visitation data corresponding to a first segment of the website visitation data, and the filtered report comprises a second filtered report having a second set of filtered website visitation data, corresponding to a second segment of the website visitation data, and wherein the first report, the filtered report and the comparison report are each displayed concurrently in separate display areas visually distinct from one another.

3. The method of claim 1, wherein the user input to activate the comparison report comprises receiving selection of one of a plurality of selectable buttons associated with the comparison report.

4. The method of claim 1, wherein the comparison report is a report selected from the group consisting of a summary report, a totals report, a commerce report, a web traffic report, and a paths report.

5. The method of claim 4, wherein receiving user input to filter the filtered report is in combination with receiving user input to filter the one or more reports as an AND operation.

6. The method of claim 1, further comprising:
in response to receiving user input to filter the filtered report, displaying one or more twice-filtered reports.

7. The method of claim 1, further comprising:
storing the filtered report.

8. The method of claim 1, wherein the first report comprises a user-customized report built during a current session.

9. The method of claim 1, wherein displaying the comparison report occurs virtually instantaneous with receiving user input to activate the comparison report.

10. The method of claim 1, wherein receiving user input to filter the first report comprises receiving user input to apply two or more filters, the two or more filters combined as an AND operation.

11. The method of claim 1, wherein receiving user input to filter the first report comprises receiving user input to apply two or more filters, the two or more filters combined as an OR operation.

12. The method of claim 1, wherein displaying the comparison report concurrently with the first report and the filtered report comprises:
displaying the comparison report overlapping a portion of the first report and a portion of the filtered report.

13. A computer-implemented method for providing a comparison of filtered and unfiltered website visitation data, the method comprising:
displaying a first unfiltered report and a second unfiltered report each comprising unfiltered website visitation data;
in response to receiving user input to filter the first unfiltered report based on filtering criterion, displaying a first filtered report comprising filtered website visitation data corresponding to the filtering criterion;
in response to receiving user input to activate a comparison report, concurrently displaying:
the first filtered report in a first display area and
the comparison report in a second display area visually distinct from the first display area, the display of the comparison report comprising one or more rows of data each corresponding to a given metric, wherein each row of data comprises:
a set of filtered website visitation data from the first filtered report in a first column, wherein the second set of filtered website visitation data comprises a filtered value for the given metric corresponding to the filtered website visitation data; and
a set of unfiltered website visitation data from the second unfiltered report in a second column adjacent to the first column wherein the first set of website visitation comprises an unfiltered value for the given metric corresponding to the unfiltered website visitation data; and
in response to receiving user input to adjust the filtering criterion associated with the first filtered report, dynamically updating the set of filtered website visitation data according to the adjusted filtering criterion and dynamically updating the display of the comparison report based on the updated set of filtered website visitation data.

14. A computer readable memory storing a computer program executable by a processor, the computer program producing a user interface for displaying web visitation data reports, the user interface comprising:
a report display area for displaying a plurality of reports comprising website visitation data;
a plurality of filter icons for receiving user input to apply a plurality of filters to a first of the plurality of reports;
wherein the report display area is dynamically configured to display a plurality of adjusted reports responsive to the received user input, each of the plurality of adjusted reports comprising adjusted website visitation data according to the plurality of filters; and
wherein the report display area is configured to concurrently display:
one or more of the adjusted reports in a first portion of the report display area and
one or more comparison reports in a second portion of the report display area that is visually distinct from the first portion, each displayed comparison report comprising one or more rows of data each corresponding to a given metric, wherein each row of data comprises:
a first set of website visitation data from one of the plurality of reports in a first column, wherein the first set of website visitation data is indicative of an unfiltered value for the given metric corresponding to the adjusted website visitation data; and
a second set of website visitation data from one or more of the adjusted reports in a second column adjacent to the first column, wherein the second set of website visitation data is indicative of a filtered value for the given metric corresponding to the website visitation data; and
wherein the set of website visitation data of at least one of the first and second displayed reports is dynamically updated according to filtering criterion received from a user, and the display of the comparison report is dynamically updated based on the updated website visitation data.

15. The computer readable memory of claim 14, the user interface further comprising one or more selectable buttons.

16. The computer readable memory of claim 14, further comprising:
an executable process that displays the one or more comparison reports in response to receiving user input to activate a selected of the one or more comparison reports.

17. The computer readable memory of claim 14, wherein the one or more comparison reports are displayed in a pop up window.

18. The computer readable memory of claim 14, wherein the one or more comparison reports are displayed in a window adjacent to the plurality of adjusted reports.

19. The computer readable memory of claim 14, wherein the one or more comparison reports are selected from the group consisting of a summary report, a totals report, a commerce report, a web traffic report, and a paths report.

20. The computer readable memory of claim 14, wherein the plurality of filter icons are further configured for receiving user input to filter the plurality of filtered reports, and the report display area is further configured for displaying a plurality of twice-filtered reports.

21. A system for providing a summary comparison of website visitation data, the system comprising:
- a processor; and
- a computer readable storage medium storing program code executable by the processor, the computer program code comprising:
  - an output module configured for displaying a first report including website visitation data;
  - an input module configured for receiving user input to filter the first report based on filtering criterion and for receiving user input to activate a comparison report;
  - wherein the output module is further configured for concurrently displaying:
    - a filtered report in a first display area, the filtered report comprising filtered website visitation data corresponding to the filtering criterion; and
    - a comparison report in a second display area visually distinct from the first display area, the display of the comparison report comprising one or more rows of data each corresponding to a given metric, wherein each row of data comprises:
      - a first set of website visitation data from the first report in a first column, wherein the first set of website visitation data comprises an unfiltered value for the given metric corresponding to the unfiltered website visitation; and
      - a second set of website visitation data from the filtered report in a second column adjacent to the first column, wherein the second set of website visitation data comprises a filtered value for the given metric corresponding to filtered website visitation data; and
  - wherein the output module is further configured to dynamically update the second set of website visitation data according to the filtering criterion and dynamically update the display of the comparison report based on the updated second set of website visitation data in response to receiving user input to adjust filtering criterion associated with at least one of the first report and the filtered report.

22. The system of claim 21, wherein the comparison report is a report selected from the group consisting of a summary report, a totals report, a commerce report, a web traffic report, and a paths report.

23. The system of claim 21, wherein the input module is further configured to receive user input to filter the filtered report and the output module is further configured to display one or more twice-filtered reports.

24. The system of claim 21, further comprising:
a storage module for storing the filtered report.

25. The system of claim 21, further comprising:
a query module configured for retrieving a data set comprising website visitation data associated with the first report.

26. The system of claim 21, further comprising:
an interpret module configured for interpreting data received from a network.

* * * * *